United States Patent [19]

Ishigaki et al.

[11] 4,347,510
[45] Aug. 31, 1982

[54] APPARATUS FOR AUTOMATIC SELECTIVE SWITCHING AND TRANSMISSION OF INPUT SIGNALS

[75] Inventors: Yukinobu Ishigaki, Machida; Hideaki Ozaki, Sagamihara, both of Japan

[73] Assignee: Victor Company of Japan, Ltd., Yokohama, Japan

[21] Appl. No.: 134,223

[22] Filed: Mar. 26, 1980

[30] Foreign Application Priority Data

Mar. 29, 1979 [JP] Japan .................. 54-36233
May 18, 1979 [JP] Japan .................. 54-61330
May 28, 1979 [JP] Japan .................. 54-65863

[51] Int. Cl.³ ............................................. H04Q 3/00
[52] U.S. Cl. .................................. 340/825.5; 367/198
[58] Field of Search .............. 340/147 LP, 162, 825.5; 328/154; 317/198

[56] References Cited

U.S. PATENT DOCUMENTS 2,922,084 1/1960 Franz ........................... 340/147 LP
3,202,841 8/1965 Kunzke ......................... 340/147 LP
3,300,758 1/1967 Hawley ......................... 340/147 LP
3,395,394 7/1968 Cottrell ........................ 340/147 LP
3,922,641 11/1975 Gates ........................... 340/147 LP Primary Examiner—Harold I. Pitts
Attorney, Agent, or Firm—Michael N. Meller; Anthony H. Handal

[57] ABSTRACT

Apparatus for automatic selective switching and transmitting of input signals in which switching circuits are provided for respective transmitting systems of a plurality of input signals. The switching circuits undergo opening and closing operations to carry out non-transmitting and transmitting of signals. Input signal detection circuits are supplied with said input signals and detect the same to produce detected signals. A circuit for forming control signals is supplied with the detected signals and forms control signals for closing the switching circuit provided for the transmitting system of an input signal which has arrived and causes the switching circuits of the other transmitting systems to open or to remain opened.

3 Claims, 8 Drawing Figures

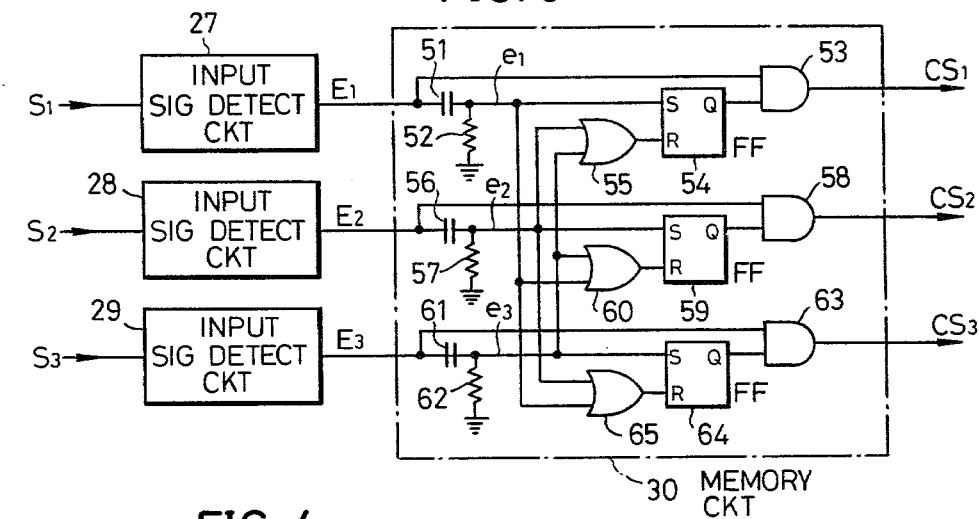
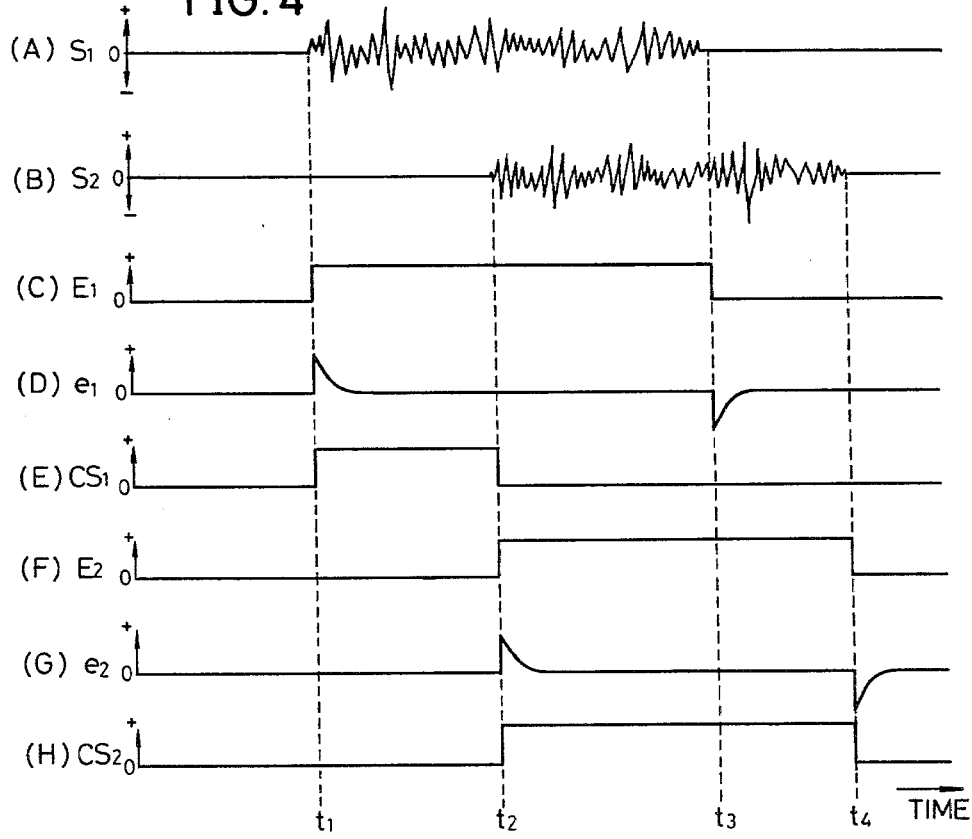

APPARATUS FOR AUTOMATIC SELECTIVE SWITCHING AND TRANSMISSION OF INPUT SIGNALS

BACKGROUND OF THE INVENTION

The present invention relates to an apparatus which automatically carries out selective switching and transmission of input signals of a plurality of systems. More particularly, the invention relates to an apparatus which automatically carries out selective switching into a signal transmission state the system of an input signal arriving later from among input signals of a plurality of systems.

For the purpose of switching signals of a plurality of kinds of systems from, for example, a radio tuner, a record disc player, a cassette tape deck, open-reel tape deck, and the like and reproducing and converting into sound a selected signal by means of a reproducing apparatus comprising a set of amplifiers, speakers, etc., a function switch has heretofore been used to carry out the changeover switching. More specifically, by manually actuating the function switch, it was switched to the "RADIO" indication position when a radio was to be listened to, to the "PHONO" indication position when a record disc was to be listened to, and to the "TAPE" indication position when an open-reel tape or a cassette tape was to be listened to.

For this reason, the manual manipulation of the function switch has been disadvantageously troublesome. Furthermore, as for the frequency of use, in general, the instances in which FM radio is listened to are more numerous than those in which a record disc or a tape is played. For this reason, in the case where, for example, the function switch is left as it is after a record disc has been played and listened to, and the power supply is subsequently thereafter turned on in order to listen to an FM radio program, the sound of the radio broadcast is not produced. Then, realizing that no sound is being produced, the listener has had to carry out the manipulative operation of changing over the function switch, which operation has been inconvenient.

SUMMARY OF THE INVENTION

Accordingly, it is a general object of the present invention to provide a new and useful apparatus for automatic selective switching and transmitting of input signals in which the above described inconvenience has been eliminated.

Another and spcific object of the invention is to provide an apparatus for automatic selective switching and transmitting of input signals which automatically switches into a signal transmitting state the system of an input signal which has arrived later from among a plurality of input signal systems. By the use of the apparatus of the invention, there is no necessity whatsoever of carrying out a bothersome operation such as changing over a function switch by manual manipulation according to the system whose input signal is to be used, as in the conventional apparatus.

Still another object of the invention is to provide an apparatus for automatic selective switching and transmitting of input signals which normally leaves in a signal transmitting state the input signal system of the highest frequency of use among a plurality of input signal systems and, in the case where the input signal of another system arrives as input, automatically switches this other system into a signal transmitting state.

A further object of the invention is to provide an apparatus for automatic selective switching and transmitting of input signals which, after the system of the input signal which has arrived has assumed the signal transmitting state as stated above, causes that signal transmitting state to be sustained so that another signal system will not be switched to its signal transmitting state as a result of erroneous operation due to effects such as noise from the outside.

Other objects and further features of the invention will be apparent from the following detailed description with respect to preferred embodiments of the invention when read in conjunction with the accompanying drawings.

BRIEF DESCRIPTION OF THE DRAWINGS

In the drawings:

FIG. 3 is a circuit system diagram of one embodiment of a specific circuit in concrete form of an essential part of the apparatus shown in FIG. 2;

FIGS. 4(A) through 4(H) are respectively waveform charts respectively of signals at various parts of FIGS. 2 and 3;

DETAILED DESCRIPTION

Figure 1:
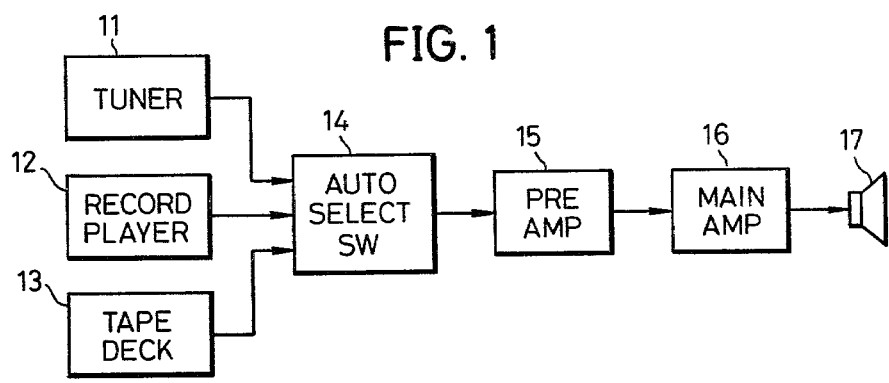
FIG. 1 is a block schematic diagram of one example of a signal reproducing apparatus in which the apparatus of the present invention is applied.

Referring first to FIG. 1, a radio tuner 11, a record disc player 12, a tape deck 13, and the like are connected to an apparatus 14 for automatic selective switching of input signals (hereinafter referred to simply as "automatic switching apparatus"). When a signal arrives as input from the radio tuner 11, for example, the automatic switching apparatus 14 feeds this signal to a pre-amplifier 15. When, with the automatic switching apparatus 14 in this state, the record disc player 12, for example, is operated to play a record disc, the automatic switching apparatus 14 operates automatically in response to the resulting signal from the record disc player 12 to place the system of the signal from the radio tuner 11 in a non-transmitting state and feeds the signal from the record disc player 12 to the pre-amplifier 15. The same operation is carried out also in the case of the tape deck 13. Therefore, there is no necessity of manual switching of the input signal systems by means of a function switch as was necessary heretofore, and an arriving signal is automatically fed to the circuit system of the succeeding stage. The signal thus fed to the pre-amplifier 15 is supplied through a main amplifier 16 to a speaker 17 and is emitted as sound.

Next, specific organizations of the automatic switching apparatus 14 according to the invention will now be described with respect to preferred embodiments thereof.

Figure 2:
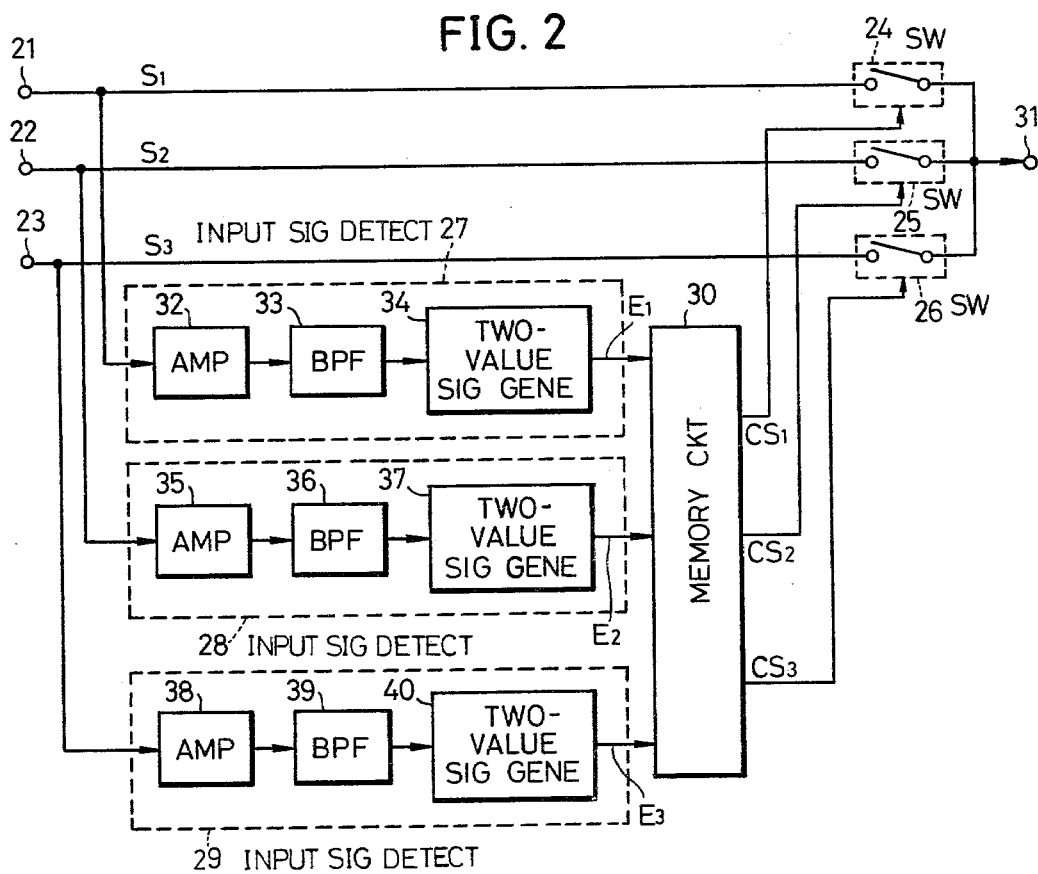
FIG. 2 is a block schematic diagram of a first embodiment of the apparatus for automatic selective switching and transmitting of input signals according to the present invention.

The first embodiment of the automatic switching apparatus 14 of the invention is illustrated in FIG. 2. The radio tuner 11, the record disc player 12, and the tape deck 13 shown in FIG. 1 are respectively connected to input terminals 21, 22, and 23. Between the input terminals 21, 22, and 23 and an output terminal 31 are connected normally-open switching circuits 24, 25, and 26, respectively. To the input terminals 21, 22, and 23 are further connected input signal detection circuits 27, 28, and 29.

The input signal detection circuits 27, 28, and 29 operate to detect and convert respectively input signals S1, S2, and S3 arriving through the input terminals 21, 22, and 23 into two-value signals of "1" or "0." These input signal detection circuits 27, 28, and 29 respectively comprise high-gain amplifiers 32, 35, and 38, band-pass filters 33, 36, and 39, and two-value signal generating circuits 34, 37, and 40 in cascade connection as shown in FIG. 2.

Here, even in cases such as, for example, the case where, in the record disc player 12, the pickup stylus traces along a soundless groove on a record disc, whereby a reproduced signal is not supplied to the input terminal 22, but a noise component signal of the soundless groove is supplied, or the case where, in the tape deck 13, an unrecorded part on the tape passes by the magnetic heads, whereby a reproduced signal is not supplied to the input terminal 23, and only the hiss noise of the tape is being supplied, the high-gain amplifiers 32, 35, and 38 amplify with high gain the arriving input signals so that a circuit system to be described hereinafter will operate normally, that is, so that it will operate normally not only with the reproduced signal but also the noise component thereof which is relatively continuous.

The internal noise of each amplifier comprises a so-called 1/f noise of 20 to 30 Hz or lower in the low-frequency range and a white noise which is a so-called $f^2$ noise of 30 KHz or higher in the high-frequency range. On the other hand, the noise components of the signals arriving as input through the above mentioned input terminals 21, 22, and 23 are present mostly in the frequency range of 1 KHz to 5 KHz. Accordingly, the output signals of the high-gain amplifiers 32, 35, and 38 are respectively supplied to the band-pass filters 33, 36, and 39 of filtering bands of 1 KHz to 5 KHz, and, even when the input signals consist of only noise components, they are distinguished from the internal noise generated in the amplifiers and are supplied to the two-value signal generating circuits 34, 37, and 40.

The two-value signal generating circuits 34, 37, and 40 have a known circuit organization and, with respect to input signals S1 and S2 indicated in FIGS. 4(A) and 4(B), for example, produce as output two-value signals E1 and E2 which, as indicated in FIGS. 4(C) and 4(F), become "1" in the period in which the input signals exist and are "0" during other periods.

The output two-value signals E1, E2, and E3 of the two-value signal generating circuits 34, 37, and 40 are respectively supplied to a memory circuit (switching control signal generating circuit) 30. This memory circuit 30, in one embodiment of the present invention, has a circuit organization as illustrated in FIG. 3. Then, when an input signal S1 as indicated in FIG. 4(A) is applied to the input terminal 21 from a time instant t1, for example, a two-value signal E1 indicated in FIG. 4(C) is supplied as mentioned above from the input signal detection circuit 27 to the memory circuit 30.

This two-value signal E1 is supplied to one input terminal of an AND gate 53 of the memory circuit 30 and opens this gate and, at the same time, is differentiated by a differentiation circuit comprising a capacitor 51 and a resistor 52, thereby being formed into a differentiated pulse e1 indicated in FIG. 4(D). The differentiated pulse e1 is applied to the setting input terminal S of an R-S flip-flop 54 and, at the same time, is applied to OR gates 60 and 65. As a result of the application of the differentiated pulse e1 to its setting input terminal S, the flip-flop 54 produces an output voltage as indicated in FIG. 4(E) through its output terminal Q. This output voltage is led out through the AND gate 53 as a switching control signal CS1. This control signal CS1 is applied to the switching circuit 24 to close the same.

Thus, when an input signal S1 arrives as an input from the radio tuner 11, the above mentioned control signal CS1 is generated, whereby the switching circuit 24 is automatically closed, and the signal S1 introduced through the input terminal 21 is led out through the output terminal 31 to be supplied to the pre-amplifier 15 of the succeeding stage.

In this case, the differentiated pulse e1 supplied to the OR gates 60 and 65 is applied therethrough to the resetting input terminals R respectively of R-S flip-flops 59 and 64. Consequently, output voltages are not led out from these flip-flops 59 and 64, and the switching circuits 25 and 26 remain opened.

Then, with the apparatus in this state, the record disc player 12, for example, is operated in order to play a record disc, and the pickup stylus is placed on the record disc. An input signal S2 as indicated in FIG. 4(B) thereupon enters through the input terminal 22 from the time instant t2. In response to this input signal S2, a two-value signal E2 as indicated in FIG. 4(F) is formed in the input signal detection circuit 28 and is supplied to the memory circuit 30. This two-value signal E2 is supplied to one input terminal of an AND gate 58 and opens this gate and, at the same time, is differentiated by a differentiation circuit comprising a capacitor 56 and a resistor 57, thereby being formed into a differentiated pulse e2 indicated in FIG. 4(G). The differentiated pulse e2 is applied to the setting input terminal S of an R-S flip-flop 59 and, at the same time, is applied to OR gates 55 and 65. As a result of the application of the differentiated pulse e2 to its setting input terminal S, the flip-flop 59 produces an output voltage as indicated in FIG. 4(H) through its output terminal Q. This output voltage is led out through the AND gate 58 as a switching control signal CS2. This control signal CS2 is applied to the switching circuit 25 to close the same at the time instant t2.

On the other hand, the differentiated pulse e2 supplied to the OR gates 55 and 65 is applied therethrough to the resetting input terminals R respectively of R-S flip-flops 54 and 64. Consequently, the flip-flop 54 is reset, and an output is no longer led out through its output terminal Q. For this reason, the control signal CS1 becomes zero at the time instant t2 as indicated in FIG. 4(E), whereby the switching circuit 24 is opened. Furthermore, an output voltage is not obtained also from the flip-flop 64, and the switching circuit 26 remains opened.

As a consequence, the record disc player 12 starts to operate, and a new input signal S2 arrives at the time instant t2, at which the switching circuit 24 automatically opens, and the input signal S1 entering through the terminal 21 is no longer led out through the output terminal 31. At the same time, the switching circuit 25 automatically closes, whereby the input signal S2 introduced through the terminal 22 is led out through the output terminal 31 and is supplied to the pre-amplifier 15.

As described above, the memory circuit 30 produces control signals as output so that, in response to one input signal, the switching circuit of the system of that input signal is closed and thereafter is maintained in this state, but when an input signal subsequently arrives at another signal system, the switching circuit which has been first closed is opened, and the switching circuit of the system of the input signal arriving later is closed.

Accordingly, a detailed description will be omitted here since this operation will be readily understood from the foregoing description. However, when an input signal S3 subsequently arrives through the input terminal 23, the input signal is differentiated in a differentiation circuit comprising a capacitor 61 and a resistor 62, and the differentiated pulses are supplied to the R-S flip-flop 64 and the OR gates 55 and 60. Consequently, the switching circuit 25 is opened, and the switching circuit 24 remains opened. The switching circuit 26 is closed by the control signal CS3, and the input signal S3 is led out through the output terminal 31.

For the above described switching circuits 24, 25, and 26, suitable switching devices which can be electrically controlled in opening and closing operations by the above mentioned control signals CS1, CS2, and CS3 can be used. Examples of such switching devices are analog switches, photocouplers, photocells, bipolar transistors, field-effect transistors, diodes, and like semiconductor elements, and electromagnetic relays.

Furthermore, while, in the embodiments of the invention illustrated in FIGS. 1 and 2, three systems of input signals are used, the number of these systems is not thus limited provided that there are a plurality of systems. This feature applies also to the embodiments of the invention hereinafter described.

Figure 5:
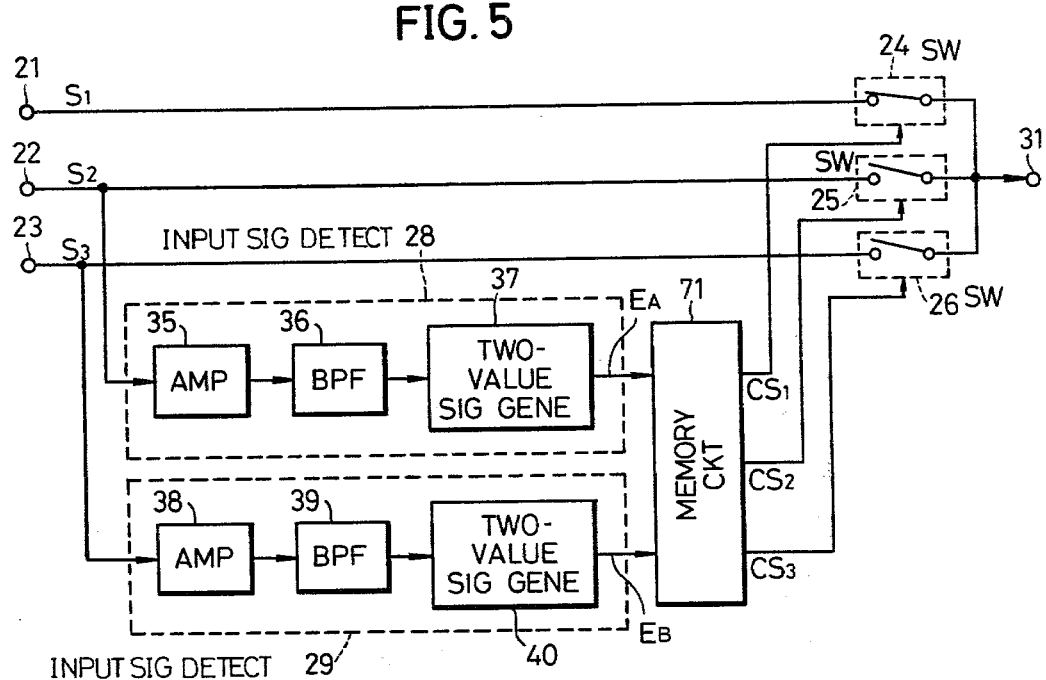
FIG. 5 is a block schematic diagram of a second embodiment of the apparatus according to the invention.

Next, the second embodiment of the apparatus of the invention will be described in conjunction with FIG. 5. In FIG. 5, those parts which are the same as corresponding parts in FIG. 2 are designated by like reference numerals. Description of such parts will not be repeated.

In the present apparatus, the input terminals 22 and 23 are connected to input signal detection circuits 28 and 29 similarly as in the preceding embodiment of the invention, but the input terminal 21 is not connected to an input signal detection circuit. Accordingly, according to the present embodiment of the invention, the number of input signal detection circuits is one circuit less in comparison with preceding embodiment, whereby the circuit organization has been simplified. The output signals of the input signal detection circuits 28 and 29 are respectively supplied to a memory circuit 71.

Figure 6:
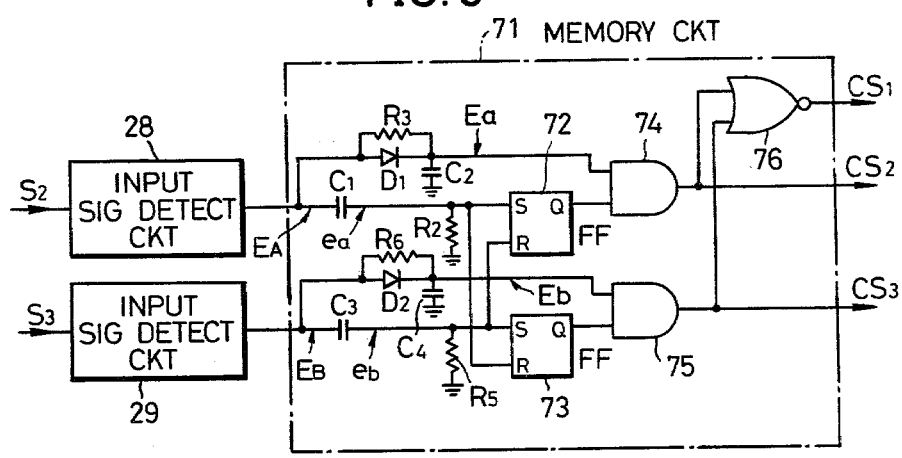
FIG. 6 is a specific circuit diagram in concrete form of an essential part in the apparatus illustrated in FIG. 5.

The memory circuit 71 has a circuit organization as indicated in FIG. 6. In the state wherein the input signals S2 and S3 are not arriving at the input terminals 22 and 23, and two-value signals $E_A$ and $E_B$ are not being obtained from the input signal detection circuits 28 and 29, the outputs of AND gates 74 and 75 are both of low level. Consequently, control signals CS2 and CS3 are not supplied to the switching circuits 25 and 26. Since the two inputs of a NOR gate 76 are of low level, its output is of high level. The output high-level signal of this NOR gate 76 is applied as the control signal CS1 to the switching circuit 24 to close the same.

Accordingly, in the state wherein an input signal is not arriving through any of the input terminals 21, 22, and 23, the switching circuits 25 and 26 are opened, and only the switching circuit 24 is in closed state with priority. Then, when the input signal S1 arrives through the input terminal 21, this signal S1 passes through the already closed switching circuit 24 and is led out through the output terminal 31.

Figure 7:
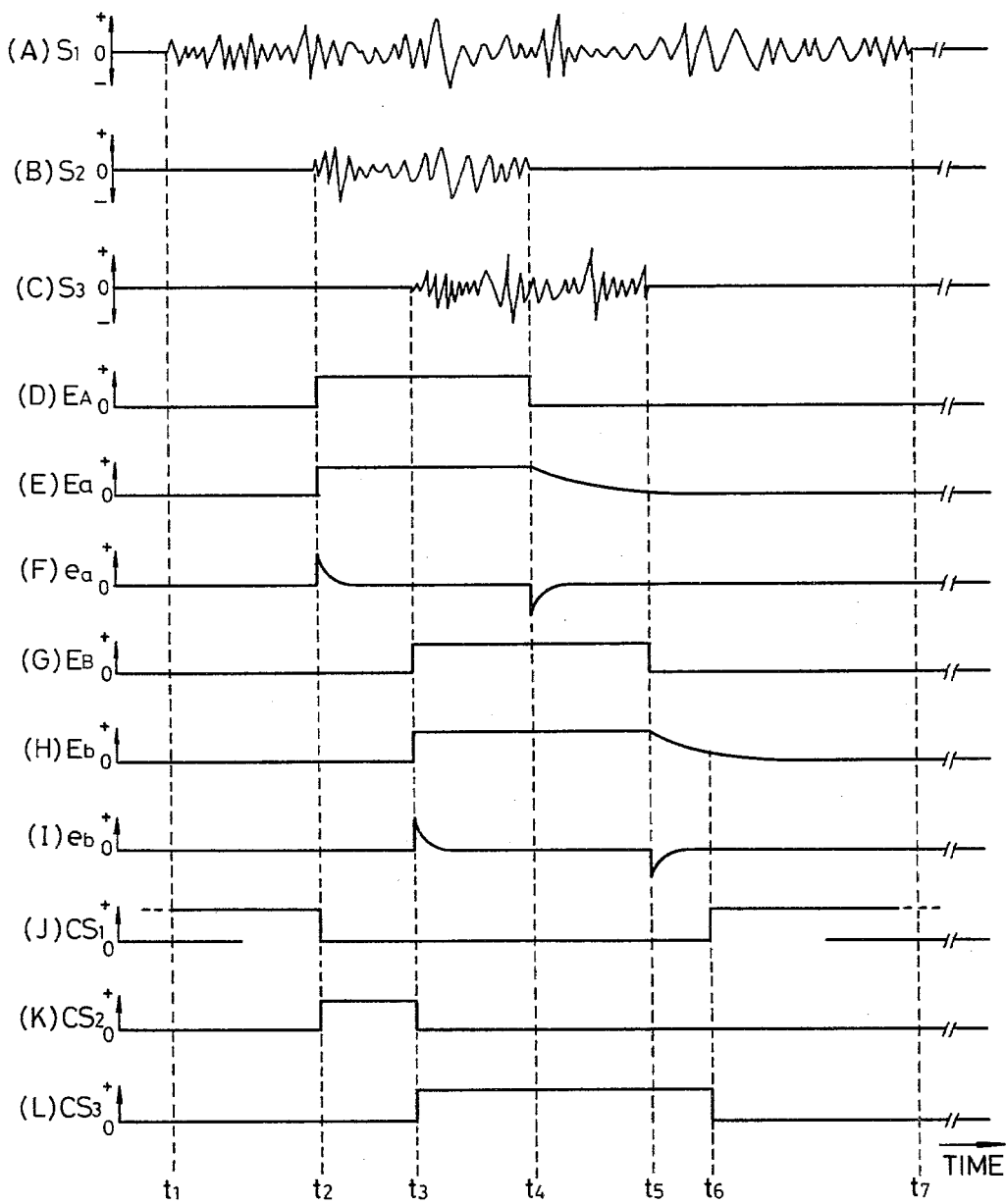
FIGS. 7(A) through 7(L) are waveform charts of signals at various parts in the circuitry illustrated in FIGS. 5 and 6.

It will be assumed that, in the state wherein an input signal S1 arrives through the input terminal 21 from a time instant t1 as indicated in FIG. 7(A) and is being transmitted to and led out through the output terminal 31, an input signal S2 arrives through the input terminal 22 at a time instant t2 as indicated in FIG. 7(B). Then, from the input signal detection circuit 28, a two-value signal $E_A$ as indicated in FIG. 7(D) is supplied to the memory circuit 71. this signal $E_A$ is differentiated by a differentiation circuit comprising a capacitor C1 and a resistor R2 within the memory circuit 71 and thus assumes the form of differentiated pulses $e_a$ as indicated in FIG. 7(F). These differentiated pulses $e_a$ are respectively applied to the setting input terminal S of an R-S flip-flop 72 and to the resetting input terminal R of an R-S flip-flop 73. As a consequence, the Q output of the flip-flop 72 becomes of high level, while the Q output of the flip-flop 73 remains at low level.

On the other hand, the two-value signal $E_A$ from the input signal detection circuit 28 is supplied to a first holding circuit comprising a diode D1, a capacitor C2, and a resistor R3. As a consequence of the high level of the signal $E_A$ at the time instant t2, the diode D1 becomes "ON," and the capacitor C2 is rapidly charged. When the input signal S2 is terminated at a time instant t4, the signal $E_A$ becomes of low level. Consequently, the diode D1 becomes "OFF," and the charge in the capacitor C2 is discharged slowly through the resistor R3 and the output resistor (not shown) of the input signal detection circuit 28. Accordingly, a signal Ea which has an instantaneous rise at the time instant t2 and a gentle fall from the time instant t4 as indicated in FIG. 7(E) is formed by the above mentioned first holding circuit and is supplied to one of the input terminals of the AND gate 74.

As a consequence, a control signal CS2 as indicated in FIG. 7(K) is obtained at the time instant t2 and thereafter from the AND gate 74. This control signal CS2 is applied to the switching circuit 25, which is thereby closed. On the other hand, the output of the AND gate 74 is applied to the NOR gate 76. As a consequence, the output control signal CS1 of the NOR gate 76 assumes a low level and disappears as indicated in FIG. 7(J). The switching circuit 24 is thereby opened. The Q output of the flip-flop 73 remains at a low level, and the control signal CS3 is not produced as output. The switching circuit 26 remains opened.

Therefore, as a result of the arrival of the input signal S2, the switching circuit 24 of the system of the signal S1 opens, while the switching circuit 25 closes, whereby the signal S2 is thereafter led out through the output terminal 31.

When an input signal S3 arrives through the input terminal 23 at a time instant t3 as indicated in FIG. 7(C), from the input signal detection circuit 29, a two-value signal $E_B$ as indicated in FIG. 7(G) is supplied to the memory circuit 71. This signal $E_B$ is differentiated by a differentiation circuit comprising a capacitor C3 and a resistor R5 within the memory circuit 71 and thus assumes the form of differentiated pulses $e_b$ as indicated in FIG. 7(I). These differentiated pulses $e_b$ are respectively applied to the setting input terminal S of the R-S flip-flop 73 and to the resetting input terminal R of the R-S flip-flop 72. As a consequence, the Q output of the flip-flop 75 becomes of high level, while the Q output of the flip-flop 72 becomes low level.

On the other hand, the two-value signal $E_B$ from the input signal detection circuit 29 is supplied to a second holding circuit comprising a diode D2, a capacitor C4, and a resistor R6. Accordingly, a signal Eb which has an instantaneous rise at the time instant t3 and a gentle fall from the time instant t5 as indicated in FIG. 7(H) is formed by the above mentioned second holding circuit and is supplied to one of the input terminals of the AND gate 75.

As a consequence, a control signal CS3 as indicated in FIG. 7(L) is obtained at the time instant t3 and thereafter from the AND gate 75. This control signal CS3 is applied to the switching circuit 26, which is thereby closed. When the Q output of the flip-flop 72 becomes low level, the control signal CS2 disappears, whereby the switching circuit 25 is opened. On the other hand, the outputs of the AND gates 74 and 75 are applied to the NOR gate 76. As a consequence, the output control signal CS1 of the NOR gate 76 maintains at low level as indicated in FIG. 7(J). The switching circuit 24 is held to be opened.

Therefore, as a result of the arrival of the input signal S3, the switching circuit 25 of the system of the signal S2 opens, while the switching circuit 26 closes, whereby the signal S3 is thereafter led out through the output terminal 31.

When the input signal S3 is terminated at the time instant t5, the signal Eb falls gently with a specific time constant. At a time instant t6 at which the signal Eb has dropped to a specific level, the output control signal CS3 of the AND gate 75 as indicated in FIG. 7(L) disappears. The discharging time constant of the above mentioned holding circuit is selected at a value such that the time interval between the above mentioned time instants t5 and t6 will be of the order of, for example, a number of seconds.

The control signal CS3 assumes a low level, and the switching circuit 26 opens. Furthermore, since the two inputs of the NOR gate 76 also assume low levels, its output control signal SC1 becomes of high level, and the switching circuit 24 closes. Consequently, a number of seconds after the disappearance of the input signal S3, the switching circuit 26 opens, and the system of the input signal S3 is cut off. The switching circuit 24 closes, and the system of the input signal S1 is placed in its signal transmitting state.

The reason why the falls of the waveforms of the signals Ea and Eb are made gentle is that, rather than emitting the signal S1 as sound immediately after the termination of the input signal, it is preferable in actual practice to afford time of the order of a few seconds for enjoyment of an aftertaste of the appreciation of the sounds of the signal S2 or S3.

Figure 8:
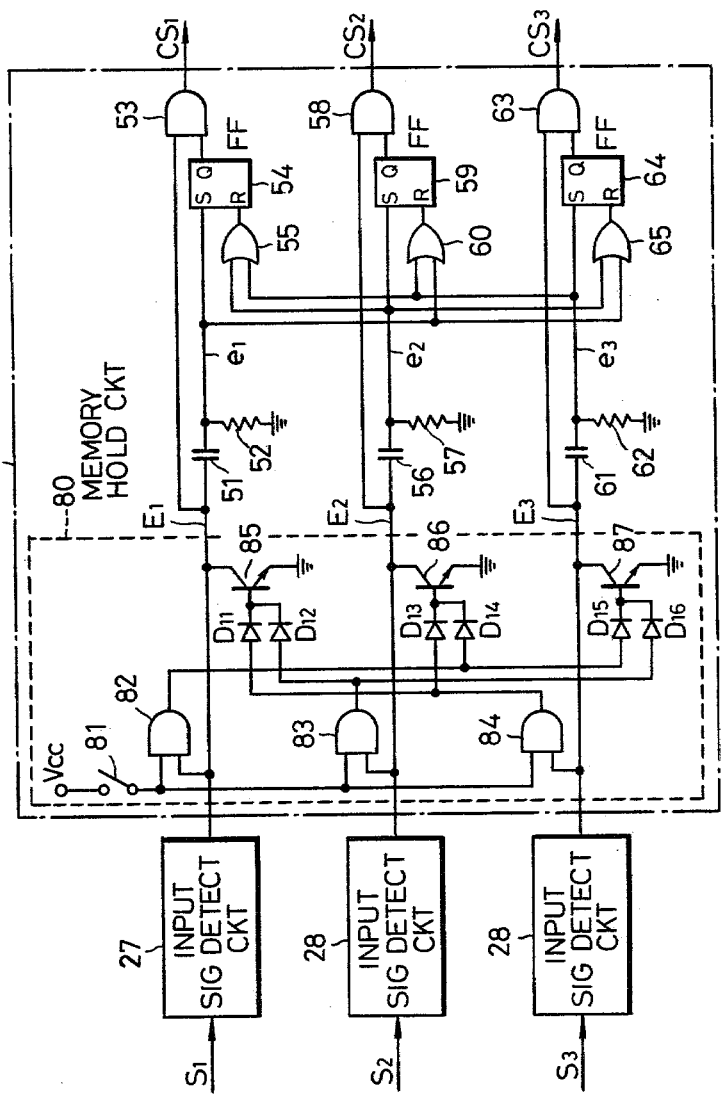
FIG. 8 is a circuit diagram of another embodiment of the specific circuit of the essential parts in the apparatus illustrated in FIG. 2.

The third embodiment of the apparatus of the invention will now be described. Because the entire block system in this embodiment is the same as that of FIG. 2, an illustration and description thereof will be omitted. However, since the organization of the memory circuit 30 differs from that in FIG. 3, it is shown in FIG. 8 as a memory circuit 30A. In FIG. 8, those parts which are the same as corresponding parts in FIG. 3 are designated by like reference numerals and characters, and description of such parts will be omitted.

The memory circuit 30A shown in FIG. 8 has an organization which results from the addition of a memory holding circuit part 80 to the circuit organization of the memory circuit 30 shown in FIG. 3. The memory holding circuit part 80 comprises a normally open switch 81, AND gates 82, 83, and 84, diodes D1 through D6, and transistors 85, 86, and 87 connected as shown in FIG. 8. When the switch 81, which is connected between the terminal of a voltage Vcc and one of the terminals of each of the AND gates 82, 83, and 84, is open, there are no outputs of the AND gates 82, 83, and 84. For this reason, the transistors 85, 86, and 87 are in their "OFF" state. Therefore, when the switch 81 is left as it is in its opened state, the memory circuit 30A operates in exactly the same manner as the memory circuit 30 of the first embodiment of the invention.

Then, in the case where the apparatus is used in an environment where there are very loud outside noises such as ignition noise, for example, there is a possibility, although slight, of erroneous operation wherein the memory circuit produces as output control signals to open the switching circuit 24 and close the switching circuit 25 or 26 as a consequence of the outside noise, as though an input signal has arrived at the input terminal 22 or 23, in spite of the fact that the original input signal is being applied to only the input terminal 21, for example.

In the case where it is desired to prevent erroneous operation of this nature and to hold only a desired signal system in the signal transmitting state, the switch 81 is closed. For example, when the input signal S1 is applied at the time instant t1 to the input terminal 21 shown in FIG. 2, the control signal CS1 is produced as output from the memory circuit 30A, and the switching circuit 24 is closed by the same operation as was described with respect to the first embodiment of the invention. Then, in order to hold this signal system in the signal transmitting state, the switch 81 is closed. By this closure of the switch 81, the power supply voltage Vcc is applied to one of the terminals of each of the AND gates 82, 83, and 84. At this time, a signal from the input signal detection circuit 27 is already being applied to the other terminal of the AND gate 82. For this reason, an output is produced from the AND gate 82.

The output of the AND gate 82 is applied by way of diodes D14 and D15 to the bases of the transistors 86 and 87, which thereby become "ON." As a consequence, the circuit system connected to the output sides of the input signal detection circuits 28 and 29 is grounded (earthed). Since there are no outputs of the AND gates 83 and 84 at this time, the transistor 85 remains in its "OFF" state. In this case, the input signals S2 and S3 are not transmitted to circuits such as the flip-flops 59 and 64 because of outside noise even when there are output signals from the input signal detection circuits 28 and 29. For this reason, the control signals CS2 and CS3 are not generated. Consequently, the switching circuits 25 and 26 remain open. At this time, there is output from the AND gate 83 or 84, and the transistor 85 becomes "ON," but since the flip-flop 54 is maintaining the set state, the control signal CS1 continues to be produced, and the switching circuit 24 remains closed.

Accordingly, by leaving the switch 81 closed, the signal system of the input signal S1 can be held in the signal transmitting state, and erroneous operation by which the switching circuits 25 and 26 are closed due to a cause such as outside noise does not occur. This applies also to the other signal systems. When, with the input signal S2 or S3 arriving and with the switching circuit 25 or 26 in closed state, the switch 81 is closed, the switching circuit which is already closed is held in the closed state, and the other switching circuits are not closed.

While, in the above described embodiment of the invention, the switch 81 is closed after an input signal arrives, the switch 81 may be closed beforehand prior to the arrival of an input signal. In this case, after the switch 81 has been closed, the system of the input signal which has arrived first at one of the input terminals 21, 22, and 23 assumes the signal transmitting state and is thereafter held in that state.

Further, this invention is not limited to these embodiments but various variations and modifications may be made without departing from the scope of the invention.

What we claim is:

1. Apparatus for automatic selective switching and transmitting of input signals comprising:

switching means provided respectively for respective transmitting systems of a plurality of input signals and undergoing opening and closing operation thereby to carry out non-transmitting and transmitting of signals;

input signal detection circuit means supplied with said input signals and detecting same to produce detected signals; and means for forming control signals supplied with said detected signals and forming control signals for closing the switching means provided for the transmitting system of an input signal which has arrived and causing the switching means of the other transmitting systems to open or to remain opened, said switching means being a plurality of normally-open switch means which close when said control signals are applied thereto, said control signal forming means generating a control signal which causes closure of the switching means provided for the transmitting system of an input signal which has arrived and does not generate a control signal with respect to the switching means provided for the other input signal transmitting systems, said control signal forming means comprising differentiation circuits provided respectively in correspondence with said input signal detection circuit means and respectively differentiating the output detected signals thereof, R-S flip-flops provided respectively in correspondence with said differentiation circuits and having respective setting input terminals to which respective output differentiated pulses of said differentiation circuits are applied, each R-S flip-flop having a resetting input terminal connected to the output side of other differentiation circuits not corresponding to that R-S flip-flop, and AND gates provided respectively in correspondence with the R-S flip-flops and supplied with the outputs of said R-S flip-flops and the output of said corresponding input signal detection circuit means, said control signals being obtained respectively from said AND gates.

2. Apparatus for automatic selective switching and transmitting of input signals comprising:

switching means provided respectively for respective transmitting systems of a plurality of input signals and undergoing opening and closing operation thereby to carry out non-transmitting and transmitting of signals;

input signal detection circuit means supplied with said input signals and detecting the same to produce detected signals; and means for forming control signals supplied with said detected signals and forming control signals for closing the switching means provided for the transmitting system of an input signal which has arrived and causing the switching means of the other transmitting systems to open or to remain opened, said switching means being a plurality of normally-open switch means closed by the application thereto of said control signals, said control signal forming means operating, under the condition of no arrival of an input signal, to generate a control signal for causing a specific switching means provided for a specific one input signal transmitting system to remain closed and, when an input signal arrives at an input signal transmitting system other than said specific input signal transmitting system to generate a control signal for opening said specific switching means and opening the switching means provided for the signal transmitting system at which said input signal has arrived, said control signal forming means comprising differentiation circuits respectively provided in correspondence with the input signal detection circuit means provided in correspondence with the input signal transmitting systems other than said specific input signal transmitting system and respectively differentiating the output detected signals thereof, R-S flip-flops provided respectively in correspondence with said differentiation circuits and having respective setting input terminals to which respective output differentiated pulses of said differentiation circuits are applied, each R-S flip-flop having a resetting input terminal connected to the output side of other differentiation circuit not corresponding to that R-S flip-flop, AND gates provided respectively in correspondence with said R-S flip-flops and supplied with the outputs of said R-S flip-flops and the output of said corresponding input signal detection circuit means, control signals with respect to the switching means provided in correspondence with the input signal transmitting systems other than said specific input signal transmitting system being obtained respectively from said AND gates, and a NOR gate supplied with the outputs of the switching means provided in correspondence with said specific input signal transmitting system being obtained from said NOR gate.

3. An apparatus as claimed in claim 1 or 2 in which said input signal detection circuit means has a band-pass characteristic of approximately 1 kHz to 5 kHz.

* * * * *